(12) United States Patent
Randel

(10) Patent No.: US 11,266,159 B2
(45) Date of Patent: Mar. 8, 2022

(54) METHOD FOR MAKING CANNABINOIDS INFUSED CONSUMABLES

(71) Applicant: Michael William Randel, Lakebay, WA (US)

(72) Inventor: Michael William Randel, Lakebay, WA (US)

(*) Notice: Subject to any disclaimer, the term of this patent is extended or adjusted under 35 U.S.C. 154(b) by 0 days.

(21) Appl. No.: 17/038,340

(22) Filed: Sep. 30, 2020

(65) Prior Publication Data

US 2021/0092972 A1  Apr. 1, 2021

Related U.S. Application Data

(60) Provisional application No. 62/909,174, filed on Oct. 1, 2019.

(51) Int. Cl.
| | |
|---|---|
| *A23D 7/005* | (2006.01) |
| *A23L 25/00* | (2016.01) |
| *A23F 5/14* | (2006.01) |
| *A23L 29/00* | (2016.01) |
| *B01J 2/00* | (2006.01) |

(52) U.S. Cl.
CPC .............. *A23D 7/005* (2013.01); *A23F 5/145* (2013.01); *A23L 25/00* (2016.08); *A23L 29/035* (2016.08); *B01J 2/00* (2013.01)

(58) Field of Classification Search
CPC ....... A23D 7/005; A23L 29/035; A23L 25/00; A23F 5/145; B01J 2/00
See application file for complete search history.

(56) References Cited

U.S. PATENT DOCUMENTS

| | | | |
|---|---|---|---|
| 9,950,275 B1* | 4/2018 | Ruben | C11B 3/006 |
| 10,028,987 B1 | 7/2018 | Pillsbury | |
| 10,103,225 B2 | 10/2018 | Reillo et al. | |
| 10,308,625 B1* | 6/2019 | Ruben | C07C 37/70 |
| 10,888,596 B1* | 1/2021 | Hindi | B01D 3/10 |
| 2017/0196923 A1 | 7/2017 | Moore | |
| 2018/0200315 A1 | 7/2018 | Silver | |
| 2020/0262806 A1* | 8/2020 | Webb | C07C 37/004 |

FOREIGN PATENT DOCUMENTS

CA  2859930 A1  3/2016

OTHER PUBLICATIONS

Weed Infused Coconut Oll. 2017. https://plvntfood.com/2017/06/04/weed-infused-coconut-oil/.*

* cited by examiner

*Primary Examiner* — Anthony J Weier
(74) *Attorney, Agent, or Firm* — Houda El-Jarrah; Bold IP, PLLC

(57) ABSTRACT

The present disclosure is directed to cannabinoids infused coffee beans, roasted nuts, and roasted seeds consumables and methods of producing the cannabinoid infused consumables. The consumables are infused in an overall two-step process, in which cannabinoids from a *Cannabis* species are first infused into coconut oil, which in turn is used to infuse a food or beverage of choice with cannabinoids to generate the cannabinoids infused consumables.

20 Claims, 3 Drawing Sheets

METHOD FOR MAKING CANNABINOIDS INFUSED CONSUMABLES

CROSS-REFERENCE TO RELATED APPLICATION

This application claims benefit of U.S. Provisional Application No. 62/909,174 filed on Oct. 1, 2019, which is incorporated by reference in its entirety.

FIELD OF THE INVENTION

The invention relates to whole *cannabis* infused coconut oil which in turn is used to infuse any of a number of consumables, such as coffee beans, roasted nuts, and roasted seeds with cannabinoids.

BACKGROUND

*Cannabis* has been used to alleviate stress and other illnesses caused by posttraumatic stress disorder, seizures, epilepsy, multiple sclerosis, and the like. *Cannabis*, commonly known as marijuana or hemp, is a genus of flowering plants that includes at least three species, *Cannabis sativa*, *Cannabis indica*, and *Cannabis ruderalis*.

*Cannabis* plants produce a variety of potentially useful or beneficial cannabinoids, which produce mental and physical effects when consumed. Cannabinoids are a chemical group or family of 21-carbon-containing terpenophenolic compounds produced by *Cannabis* species. Current estimates of the number of cannabinoids found in *Cannabis* species is well in excess of 100 different cannabinoids. Two of the most prominent cannabinoids are Cannabidiol (CBD) and Tetrahydrocannabinol (THC). In addition to CBD and THC, other cannabinoids such as cannabichromene (CBC), cannabigerol (CBG), cannabinol (CBN), and others are present in varying amounts in *cannabis* plant material.

Commonly consumed sources of cannabinoids include extracts, oils, isolates, and the like from *Cannabis* species including marijuana, hemp, and industrial hemp, which contains a THC content of less than 0.3% of overall mass. While providing useful or beneficial effects to the user, such extracts, oils, and isolates are typically found to have undesirable tastes, flavors, odors, and/or other unfavorable attributes. In addition, the amount of cannabinoids available in such products is sometimes somewhat limited.

Accordingly, there exists a need in the art for consumable cannabinoid-containing food, drink, and the like that do not have the tastes and odors of typically consumed sources of cannabinoid. There also exists a need for consumable cannabinoid-containing food, drink and the like that includes higher quantities of cannabinoids. The presently disclosed consumables and methods of preparing such consumables address this need.

SUMMARY

The present disclosure provides for orally ingestible, cannabinoid infused food and beverage consumables and methods of producing the cannabinoid infused consumables.

The method disclosed entails an overall two-step process in which coconut oil is first infused with cannabinoids from a species of *Cannabis*. In the second step, the cannabinoid infused coconut oil is used to infuse a given food to generate a cannabinoid infused food consumable. The coconut oil also can be added to a beverage, or a cannabinoid infused food can be used to generate a cannabinoid infused beverage, such as coffee from coffee beans.

An overall preferred embodiment of generating cannabinoid infused consumables is presented herein. As detailed below, the method involves a series of steps of heating and cooling/freezing a food in the presence of a source of cannabinoids (either *Cannabis* buds or coconut oil) to produce a cannabinoid infused consumable.

The presently disclosed orally ingestible, cannabinoid infused consumables are more fully described in the detailed description below.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

As is known in the art, cannabinoid is a class of chemical compounds found in plants in the *cannabis* family (e.g., hemp, marijuana, etc.). To date, at least 113 cannabinoids have been identified, accounting for up to 40% of the plant's extract. Well known cannabinoids include Cannabidiol (CBD), Tetrahydrocannabinol (THC) among others, each of which may include a variety of health benefits.

In general, the presently disclosed consumables relate to food, drink, and other consumables that provide a source cannabinoids, as well as methods of making such consumables. The presently disclosed consumables are infused with cannabinoids in a way that increases the levels and quantities of cannabinoids transferred to the consumables while reducing undesirable tastes, flavors, odors and the like typically associated with and found in commonly used cannabinoid extracts, oils, isolates, edibles and such.

The consumables which are infused with cannabinoids include essentially any food or drink that might be capable of uptake of the cannabinoids upon treatment using the method(s) described herein. Such foods include, oils (such as coconut oil), coffee beans (which are in turn used to make coffee), roasted nuts, and roasted seeds.

As used herein, the term "infused cannabinoids" or "cannabinoid infused" refers to various foods and/or drinks to which cannabinoids have been infused by a method(s) disclosed herein. The infusion method generally involves preparing a mixture made with whole *cannabis* plant materials and coconut oil (or similar oil) under specific heating and cooling conditions, and then in turn using the infused oil mixture to infuse coffee beans, roasted nuts, and roasted seed as detailed herein. Throughout this specification, cannabinoid infused food and/or drink may be referred to as "cannabinoid infused" or simply "infused," such as "cannabinoid infused coffee" or "infused coffee."

Figure 1:
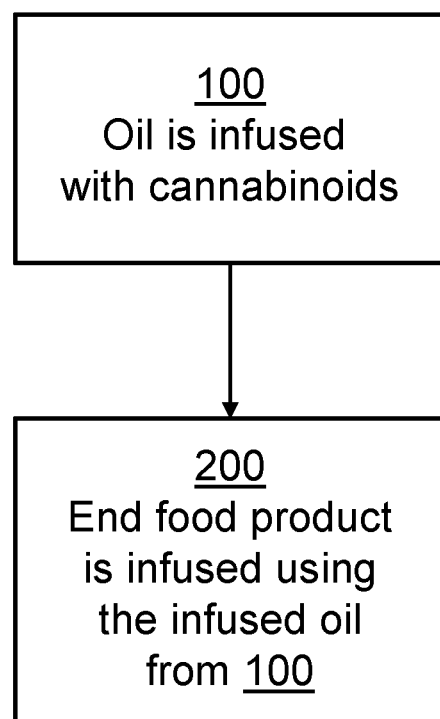
FIG. 1 shows example steps of a method according to exemplary embodiments hereof.

In some embodiments as shown in FIG. 1, cannabinoid infused foods and/or drinks prepared by the methodology disclosed herein are generated in an overall two-step process. In the first step (at 100), whole *cannabis* plant material is ground and used to infuse an oil, preferably coconut oil, with cannabinoids. Note that because whole *cannabis* plant material is used at 100, the resulting mixture may be referred to as a full spectrum *cannabis* and oil mixture. In a second step (at 200), the infused coconut oil is used to infuse an end food product, such as coffee beans, roasted nuts, or roasted seeds with cannabinoids. After the end product is infused with cannabinoids, it may be consumed in any typical fashion, such as direct consumption, used to make a beverage as in the case of coffee beans, and so forth.

Consumption of the cannabinoid food and drink consumables generated by the methods described herein provides the beneficial effects generally associated with cannabinoids. These effects include, but are not limited to, mental and physical effects, such as pain relief from CBDs and other cannabinoids, mental high from THC (in foods infused with marijuana cannabinoids), and other effects attributed to consumption of cannabinoids.

Figure 2:
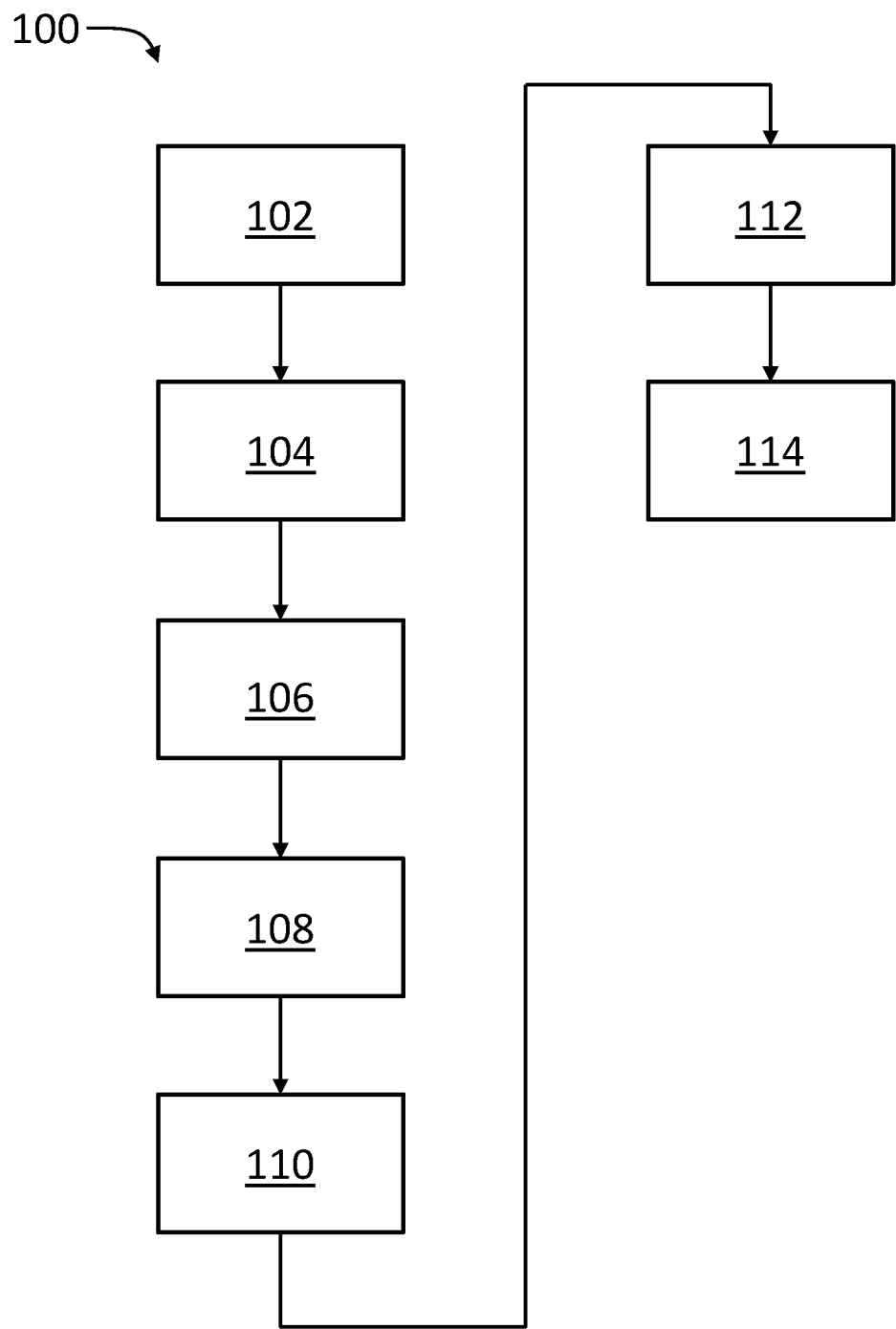
FIG. 2 shows example steps of a method according to exemplary embodiments hereof.

FIG. 2 refers to steps that may be taken to infuse an oil (e.g., coconut oil) with cannabinoids to complete step 100 of FIG. 1. In one embodiment as shown in FIG. 2, whole, raw *cannabis* plant material (e.g., flowers, buds, leaves or other plant material) is frozen (at 102). The *cannabis* plant may include *Cannabis Sativa, Cannabis Indica, Cannabis Ruderalis*, other types of *cannabis* and any combination thereof. The *cannabis* may be classified as marijuana, hemp, and/or other types of *cannabis*.

Next (at 104), the frozen *cannabis* is ground into powder form. The powder may preferably be finely ground but medium and/or coarsely ground also may be used.

Next (at 106), coconut oil (or similar oil) is heated to a temperature equal to or between 150° and 200° F., and preferably to about 175° F. For the purposes of this specification, the term "about" used in relation to temperatures will mean within ±1%.

Next (at 108), the ground *cannabis* is added to the coconut oil and held at the temperature (e.g., preferably at about 175° F.) for 4-8 hours (preferably 6 hours), while occasionally (and/or continuously) stirring the mixture. In some embodiments, the ratio of plant material to coconut oil is 1 lb to 1 gallon. However, other ratios within 10%, 20%, 30%, 40%, 50%, 75%, 100% of this ratio also may be used. In general, the ratio will be chosen to provide the desired concentration(s) of cannabinoids within the oil.

After this (at 110), the *cannabis* and coconut oil mixture is frozen for 12-24 hours, and preferably for about 12 hours.

Then (at 112), the *cannabis* and coconut oil mixture is reheated to 150° to 200° F., and preferably to about 175° F., and held at the temperature for a sufficient period of time to liquify the mixture, typically for about 2-4 hours.

Next (at 114), the *cannabis* and coconut mixture is strained using a press bag (or other suitable straining techniques) and the strained material is separated.

This method results in a *cannabis* and coconut oil mixture that may be used for direct consumption and/or for use in infusing other end products with cannabinoids as described below.

Figure 3:
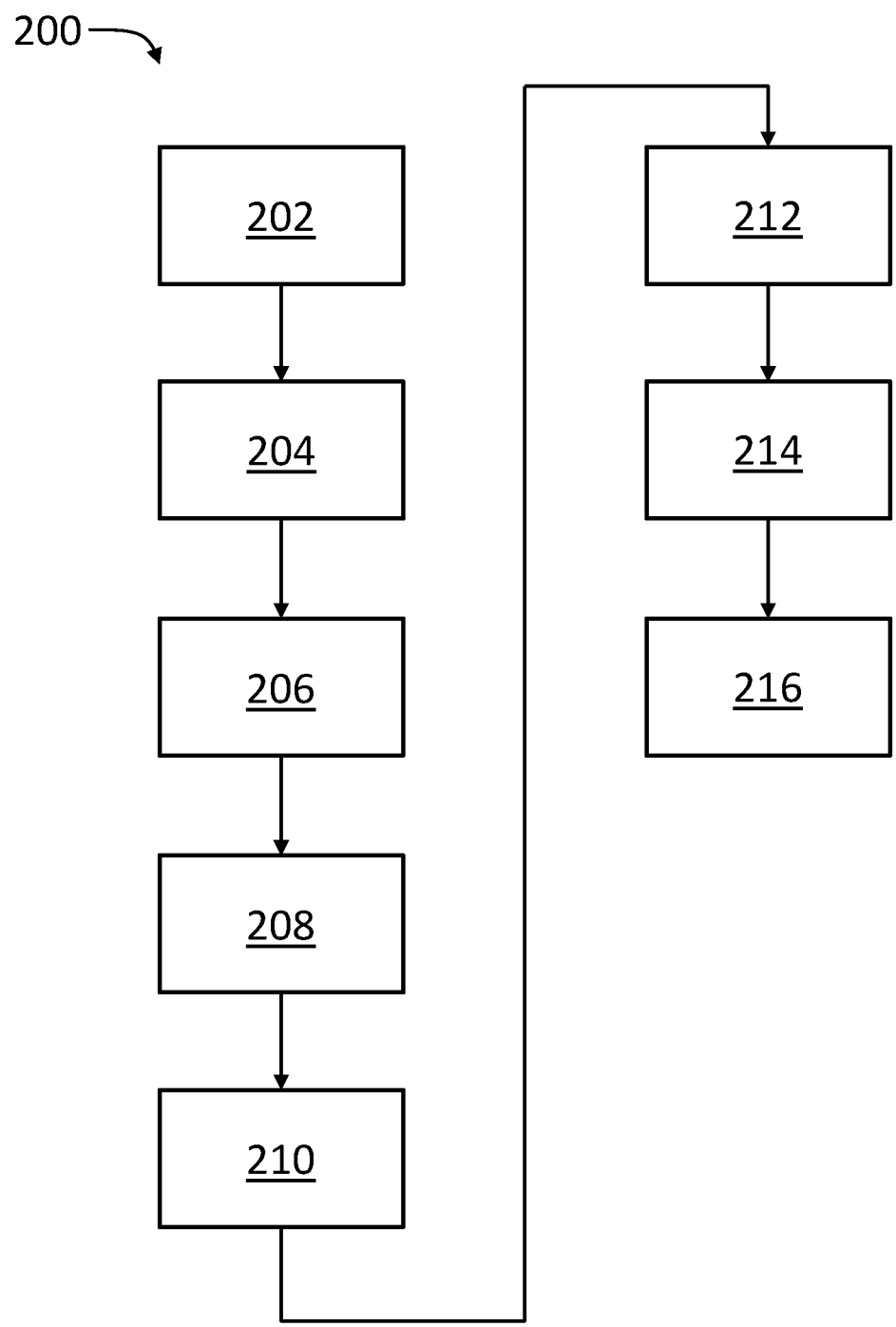
FIG. 3 shows example steps of a method according to exemplary embodiments hereof.

In another embodiment as shown in FIG. 3, a *cannabis* and coconut mixture, such as the mixture obtained from the process 102-114 (FIG. 2) described above, is used to infuse consumable products such as coffee beans, roasted nuts, and roasted seeds.

First (at 202), at least a portion of the strained *cannabis* and coconut oil mixture obtained from 102-114 (FIG. 2) is heated to a first temperature equal to or between 190° F. and 200° F.

Next (at 204), a selection of coffee beans, roasted nuts, or roasted seeds is added and stirred into the mixture and held at the first temperature (e.g., preferably about 195° F.) for about 4-12 hours, and preferably for about 7 hours. For the purposes of this specification, the term "about" used in relation to periods of time will mean±3%.

Next (at 206), the mixture including the coffee beans, roasted nuts, or roasted seeds is frozen for about 4-24 hours, and preferably for about 12 hours.

Then (at 208), the mixture including the coffee beans, nuts, seeds, etc., is heated to a second temperature equal to or between 190° F. and 200° F., and preferably to about 195° F., and held at the second temperature for about 4-12 hours, and preferably for about 7 hours.

Next (210), the mixture including the coffee beans, roasted nuts, or roasted seeds, is frozen for about 4-24 hours, and preferably for about 12 hours.

Then (at 212), the mixture including the coffee beans, roasted nuts, or roasted seeds, etc., is heated to a third temperature equal to or between 100° F. and 150° F., and held at the third temperature for a sufficient period of time to liquify the oil, typically about 2-4 hours, and preferably for about 2 hours.

After this (at 214), the mixture is strained (using any suitable straining techniques) and the coffee beans, roasted nuts, or roasted seeds are removed.

Then (at 216), the coffee beans, roasted nuts, or roasted seeds are air dried for about 4-14 days, and preferably for about 6 days.

This process 202-216 (FIG. 3) results in a selection of coffee beans, roasted nuts, or roasted seeds infused with cannabinoids thereby producing cannabinoid infused coffee beans, roasted nuts, or roasted seeds.

In some embodiments, the freezing steps at 206 and/or at 210 provide organic pressure to the coffee beans, roasted nuts, or roasted seeds that deepens the physical depth of the cannabinoid infusion into the consumables. For example, in some embodiments, the freezing steps at 206 and/or at 210 cause the cannabinoids to be pressed 10%, 20%, 30%, 40%, 50%, 60%, 70%, 80%, 90% and/or 100% to the center of each consumable (that is, to the center of each coffee bean, each nut, each seed, etc.).

It is understood that the acts described above are meant as a general overview and demonstration of an exemplary method, and that the method may include different and/or additional acts as described herein or otherwise.

An exemplary preparation of cannabinoid infused coffee beans is shown below in Example I. The cannabinoid infused coffee beans were produced using the methods disclosed herein. The preparation yielded coffee beans having significant amounts of cannabinoids, including, but not limited to: CBD; CBD-A; CBG; and CBG-A, as determined by analytical testing. Accordingly, the methods disclosed herein are effective for generating cannabinoids infused coffee beans. Likewise, the methods disclosed herein are effective for generating infused roasted nuts and roasted seeds.

While the present invention has been described as having particular configurations disclosed herein, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

EXAMPLE I

Cannabinoids infused coffee beans were produced using the above-described method and the specific steps thereof. The infused coffee beans were then tested for cannabinoids using HPLC-SOP 0011 and the resulting cannabinoid content levels are shown in Table I. The resultant cannabinoid infused coffee beans had significant amounts of cannabinoids infused, including but not limited to: CBD-A; CBD; CBG-A; and CBG. The methods described herein accordingly were demonstrated to be effective for infusing coffee beans with cannabinoids.

TABLE 1

Results of infused coffee beans tested for cannabinoids by HPLC-SOP 0011

| Analyte | LOD | LOQ | Mass | Mass |
|---|---|---|---|---|
| Δ9-THC-A | 0.000 mg/g | 0.001 mg/g | ND mg/g | ND mg/s |
| Δ9-THC | 0.000 mg/g | 0.001 mg/g | ND mg/g | ND mg/s |
| Δ9-THCV | 0.000 mg/g | 0.001 mg/g | ND mg/g | ND mg/s |
| Δ8-THC | 0.000 mg/g | 0.001 mg/g | ND mg/g | ND mg/s |
| CBN | 0.000 mg/g | 0.001 mg/g | ND mg/g | ND mg/s |
| CBD-A | 0.000 mg/g | 0.001 mg/g | 1.254 mg/g | 103.064 mg/s |
| CBD | 0.000 mg/g | 0.001 mg/g | 0.292 mg/g | 23.990 mg/s |
| CBDV-A | 0.000 mg/g | 0.001 mg/g | ND mg/g | ND mg/s |
| CBDV | 0.000 mg/g | 0.001 mg/g | ND mg/g | ND mg/s |
| CBG-A | 0.000 mg/g | 0.001 mg/g | 0.059 mg/g | ND mg/s |
| CBG | 0.000 mg/g | 0.001 mg/g | 0.155 mg/g | ND mg/s |
| CBC | 0.000 mg/g | 0.001 mg/g | ND mg/g | ND mg/s |

It is understood that any aspect and/or element of any embodiment of the method(s) described herein or otherwise may be combined in any way to form additional embodiments of the method(s) all of which are within the scope of the method(s).

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e. g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A method of infusing an orally ingestible oil with at least one cannabinoid, the method comprising:
   (A) providing *cannabis* plant material;
   (B) freezing the *cannabis* plant material;
   (C) grinding the frozen *cannabis* plant material;
   (D) providing an orally ingestible oil at a temperature of 150° F.-200° F.;
   (E) adding at least a portion of the ground *cannabis* of (C) to the oil of (D) to form a *cannabis* and oil mixture;
   (F) keeping the *cannabis* and oil mixture of (E) at a temperature of 150° F. 200° F. for 4-8 hours;
   (G) freezing the *cannabis* and oil mixture of (F) and keeping it frozen for 12-24 hours;
   (H) heating the *cannabis* and oil mixture of (G) to a temperature of 150° F.-200° F. for 2-4 hours; and
   (I) straining the *cannabis* and oil mixture to separate the oil from the *cannabis* to yield a cannabinoids infused orally ingestible oil.

2. The method of claim 1 wherein the *cannabis* provided in (A) includes one or more selected from the group consisting of *Cannabis Sativa, Cannabis* Indica, and *Cannabis* Ruderalis.

3. The method of claim 1 wherein the oil provided in (B) includes coconut oil.

4. The method of claim 1 wherein the temperature in (D) and (F) is about 175° F.

5. The method of claim 1, wherein the plant material and oil are provided at a ratio of 1 pound plant material to 1 gallon of oil.

6. A method of infusing an orally ingestible consumable with at least one cannabinoid, the method comprising:
   (A) providing *cannabis* plant material;
   (B) freezing the *cannabis* plant material;
   (C) grinding the frozen *cannabis* plant material;
   (D) providing an oil at a temperature of 150° F.-200° F.;
   (E) adding at least a portion of the ground *cannabis* of (C) to the oil of (D) to form a *cannabis* and oil mixture;
   (F) keeping the *cannabis* and oil mixture of (E) at a temperature of 150° F. 200° F. for 4-8 hours;
   (G) freezing the *cannabis* and oil mixture of (F) and keeping it frozen for 12-24 hours;
   (H) heating the *cannabis* and oil mixture of (G) to a temperature of 190° F.-200° F. for 2-4 hours;
   (I) straining the *cannabis* and oil mixture to separate the oil from the *cannabis* to yield a cannabinoids infused orally ingestible oil;
   (J) adding at least one orally ingestible consumable to the cannabinoids infused orally ingestible oil of (I) to form a consumable and infused oil mixture;
   (K) heating the mixture of (J) to a temperature of 190° F.-200° F. for 4-12 hours;
   (L) freezing the mixture of (K) for 4-24 hours;
   (M) heating the mixture of (L) to a temperature of 190° F.-200° F. for 4-12 hours;
   (N) freezing the mixture of (M) for 4-24 hours;
   (O) heating the mixture of (N) to a temperature of 100° F.-150° F. for 2-4 hours; and
   (P) removing the consumable from the mixture of (O) to yield a consumable infused with at least one cannabinoid.

7. The method of claim 6 further comprising:
   (Q) air drying the consumable infused with at least one cannabinoid of (P) for 4-14 days.

8. The method of claim 6 wherein the *cannabis* provided in (A) includes one or more selected from the group consisting of *Cannabis Sativa, Cannabis* Indica, and *Cannabis Ruderalis*.

9. The method of claim 6 wherein the oil provided in (D) includes coconut oil.

10. The method of claim 6 wherein the at least one orally ingestible consumable in (J) includes one or more selected from the group consisting of coffee beans, roasted nuts, and roasted seeds.

11. The method of claim 6 wherein the temperature of (D) and (F) is about 175° F.

12. The method of claim 6 wherein the mixtures of (K) and (M) are held at the temperature of 190° F.-200° F. for about 7 hours.

13. The method of claim 6 wherein the mixtures of (L) and (N) are kept frozen for about 12 hours.

14. The method of claim 1, wherein the plant material and oil are provided at a ratio of 1 pound plant material to 1 gallon of oil.

15. The method of claim 7, wherein the consumable infused with at least one cannabinoid is air dried for 6 days.

16. A method of infusing an orally ingestible consumable with at least one cannabinoid, the method comprising:
   (A) providing a *cannabis* infused oil;
   (B) adding at least one orally ingestible consumable to the *cannabis* infused oil of (A) to form a consumable and infused oil mixture;
   (C) heating the mixture of (B) to a temperature of 190° F.-200° F. for 4-12 hours;
   (D) freezing the mixture of (C) for 4-24 hours;
   (E) heating the mixture of (D) to a temperature of 190° F.-200° F. for 4-12 hours;
   (F) freezing the mixture of (E) for 4-24 hours;
   (G) heating the mixture of (F) to a temperature of 100° F.-150° F. for 2-4 hours; and
   (H) removing the consumable from the mixture of (G) to yield a consumable infused with at least one cannabinoid.

17. The method of claim 16 wherein the at least one orally ingestible consumable in (B) includes one or more selected from the group consisting of coffee beans, roasted nuts, and roasted seeds.

18. The method of claim 16 wherein the mixtures of (C) and (E) are held at the temperature of 190° F.-200° F. for about 7 hours.

19. The method of claim 16 wherein the mixtures of (D) and (F) are kept frozen for about 12 hours.

20. The method of claim 16 further comprising:
   (I) air drying the consumable infused with at least one cannabinoid of (H) for 4-14 days.

* * * * *